Sept. 3, 1957 G. S. RANDLES ET AL 2,804,789
CHATTERLESS COUNTERSINK AND DEBURRING TOOL
Filed July 11, 1956

INVENTORS
GUY S. RANDLES &
WILLIAM D. REYNOLDS
BY
W.B.Harpman
ATTORNEY

United States Patent Office 2,804,789
Patented Sept. 3, 1957

2,804,789

CHATTERLESS COUNTERSINK AND DEBURRING TOOL

Guy S. Randles and William D. Reynolds, Alpena, Mich.

Application July 11, 1956, Serial No. 597,266

7 Claims. (Cl. 77—73.5)

This invention relates to a chatterless countersink and deburring tool for the removal of sharp edges or holes of countersunk openings.

The principal object of the invention is the provision of a chatterless countersink and deburring took having a 360 degree continuous bearing surface about said tool engaging a workpiece and dampening vibration therein to prevent chattering.

A further object of the invention is the provision of a tool of the class described incorporating means for controlling the depth of the cut as desirable for various materials.

A still further object of the invention is the provision of a tool of the class described wherein a blade is mounted for right angular movement with respect to the axis of the tool so as to permit the blade to be self-centering with respect to a workpiece and whereby the cut taken by the tool is evenly balanced.

A still further object of the invention is the provision of a tool of the class described wherein the blade rests directly against the shank of the tool during the cutting operation so that a sturdy construction capable of carrying working pressures results.

A still further object of the invention is the provision of a tool of the class described wherein the chip made by the blade may be controlled by the relative positioning of an adjacent portion of the tool.

The countersink and deburring tool disclosed herein comprises an improvement in the art and particularly with respect to the tool disclosed in our Patent No. 2,703,996 on Chatterless Deburring Tool, in which patent the cutting blade is movably mounted with respect to a conical bearing surface and is spring tensioned with respect thereto while in the present disclosure the cutting blade is fixed to a shank and engaged directly thereby when in use although capable of movement transversely to the axis of the shank and the blade so as to be self-centering with respect to a workpiece.

Those skilled in the art will recognize that prior to the disclosure of our above-mentioned patent it had been impossible to chamfer or deburr the area about a circular opening with the tools heretofore known in the art without the tool chattering and the resultant production of an irregular or uneven surface finish.

The present tool, like that disclosed in our hereinbefore mentioned patent, overcomes these difficulties by providing a 360° conical bearing surface adjacent the working edges of the cutting blade, which conical bearing surface is spring urged against the workpiece with respect to the shank carrying the blade while the blade itself is firmly backed up by the shank.

Additionally, the shank in the present tool is so formed that it has a matching conical end portion which is transversely slotted and in which transverse slot the blade is positioned so that the majority of the blade is held against chattering motion by the engagement of the relatively large area of the shank of the tool against the opposite sides of the blade.

With the foregoing and other objects in view which will appear as the description proceeds, the invention resides in the combination and arrangement of parts and in the details of construction hereinafter described and claimed, it being the intention to cover all changes and modifications of the example of the invention herein chosen for purposes of the disclosure, which do not constitute departures from the spirit and scope of the invention.

The invention is illustrated in the accompanying drawing, wherein.

Figure 1:
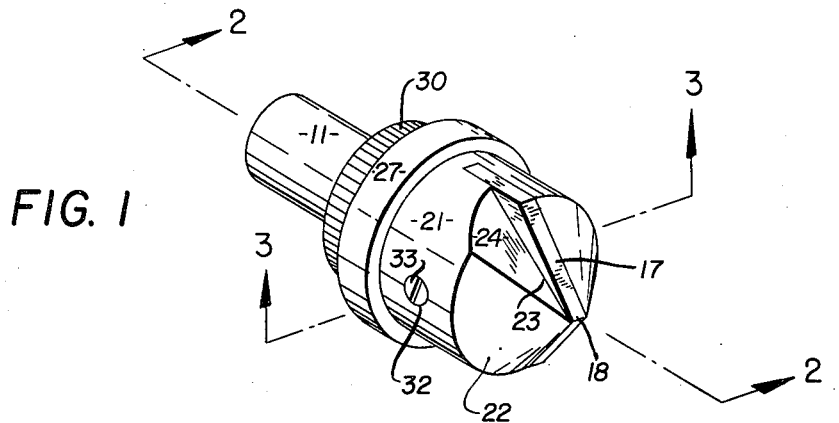
Figure 1 is a perspective view of the tool.
Figure 2:
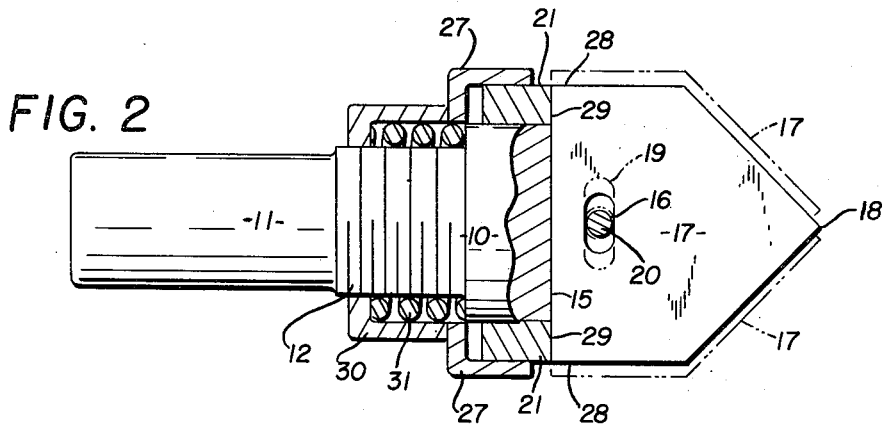
Figure 2 is a vertical section taken on line 2—2 of Figure 1.
Figure 3:
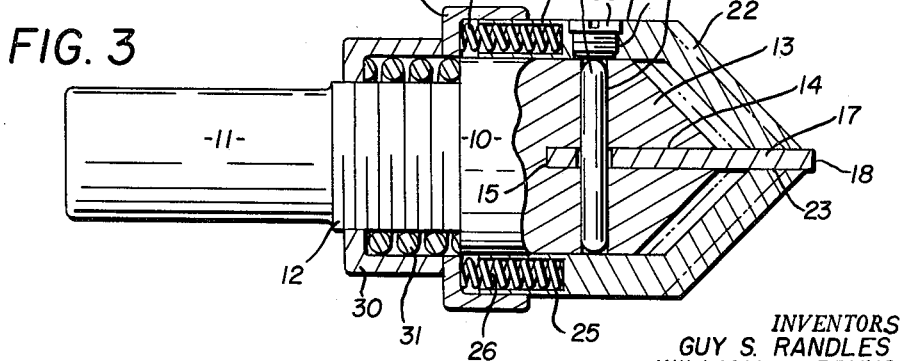
Figure 3 is a horizontal section taken on line 3—3 of Figure 1.

By referring to the drawings and Figures 1, 2 and 3 it will be seen that the chatterless countersink and deburring tool comprises a body member 10 which has a shank 11 extending axially thereof, a portion 12 of which is threaded exteriorly and is of lesser diameter than the body member 10 and of greater diameter than the shank 11 and is positioned intermediate the same.

The body member 10 has a conical end portion 13 which is slotted transversely as at 14, the slot crossing the apex of the conical end portion 13 and extending inwardly of the body member 10 to a point spaced forwardly thereof with respect to the adjacent threaded area 12 heretofore described. The inner end of the slot 14 is indicated by the numeral 15.

A transverse opening 16 extends through the body member 10 at right angles to the slot 14 and passes therethrough so as to communicate therewith. A blade of substantially triangular shape having an apex 18 is disposed in the slot 14. The blade 17 has an elongated slot-like opening 19 therein transversely thereof and at right angles to the axis of the body 10 and shank 11.

A pin 20 of a length not exceeding the widest portion of the body member 10 is disposed in the opening 16 and extends across the slot 14 and engages the slot-like opening 19 in the blade 17, as best seen in Figure 3 of the drawings.

By referring now to Figure 3 of the drawings it will be observed that the flat, straight, innermost or rear edge of the blade 17 is positioned in abutting relation to the body member 10 as defined by the inner end 15 of the slot 14 therein and that the blade 17 is held in such abutting relation to the body member 10 by the pin 20 while at the same time it is movable transversely of the body member 10 by reason of the elongated slot-like opening 19 in the blade 17.

The degree of movement is indicated by a broken line representation of the blade 17 in Figure 2 of the drawings.

A sleeve 21 having a conical forward end portion 22 is movably positioned over the body member 10 and the conical end portion 13 thereof, as best seen in Figures 1 and 3 of the drawings, and is always positioned with the conical forward end portion 22 thereof in spaced relation to the conical end portion 13 of the body member 10.

The sleeve 21 and the conical forward end portion 22 are slotted transversely as at 23 and the edges of the blade 17 are positioned in the slot 23 so that the apex 18 of the blade 17 and the adjacent annular surfaces thereof extend beyond the surface of the conical end portion 13 of the sleeve 21.

The oppositely disposed portions of the conical forward end portion 22 of the sleeve 21 are cutaway as at 24 with respect to the edges of the blade 17, as best seen in Figure 1 of the drawings.

Those skilled in the art will recognize that the cutaway areas 24 provide clearance for the chips being removed by the blade 17.

By referring now to Figure 3 of the drawings it will be seen that the sleeve 21 is provided with a plurality of openings 25—25 in its innermost annular end, which openings 25—25 are circumferentially spaced with respect to one another. Each of the openings 25—25 cages a tensioning spring 26—26, one end of each of which extends outwardly of the opening 25 in which it is caged and engages an annular flanged collar 27. The flange of the annular flanged collar 27 overlies the adjacent portion of the sleeve 21. Therefore, the springs 26—26 urge the sleeve 21 away from the flanged collar 27 and the sleeve 21 is retained on the tool by reason of the outermost sides 28—28 of the blade 17 engaging against the innermost ends 29 of the slot 23 in the sleeve 21.

A secondary flanged collar 30 is threadably engaged on the threaded portion 12 of the body member 10. A secondary tensioning spring 31 is caged between the secondary flanged collar 30 and the adjacent larger diametered body member 10.

The exterior of the secondary flanged collar 30 is knurled, as best seen in Figure 1 of the drawings, so that it may be manually rotated, and, as it is engaged against the flanged collar 27, it regulates the distance the sleeve 28 can retract with respect to the blade 17 thereby controlling the thickness of the chip being cut. The tensioning springs 26—26 provide the proper tension to be effective in controlling chattering whether the blade 17 is of maximum length or after it has been ground to minimum length.

Those skilled in the art will recognize that the secondary tensioning spring 31 merely serves as a friction lock to hold the secondary flanged collar 30 in desired position on the threaded portion 12 of the body member 10.

It will be observed that in order to assemble the tool, it is necessary to position the blade 17 through the slot 23 in the sleeve 21, it being observed that the portions of the flat, straight, innermost or rear edge of the blade 17 adjacent its opposite sides 28 engage against the innermost ends or bottoms 29—29 of the slot 23 and then position the blade and sleeve assembly on the body member 10 over the conical end portion 13 so that the blade 17 engages the slot 14, and the flat, straight, innermost or rear edge of the blade 17 abuts the bottom or innermost end 15 thereof whereupon the pin 20 may be positioned through an opening 32 in the sleeve 21 so as to engage the opening 16 in the body member 10 and the elongated slot-like opening 19 in the blade 17.

A threaded plug 33 is then engaged in the opening 32 so that the pin 20 is retained in the assembly. The flanged collar 27, tensioning springs 26—26 and secondary tensioning spring 31 having been previously positioned on the body member 10, the assembly is thus complete.

In operation it will be seen that when the shank 11 is secured in any machine capable of rotating the tool and the opposite or pointed end of the tool presented to a workpiece such as an opening in an object to be countersunk or deburred and the tool revolved, the cutting edges of the blade 17 will perform the deburring and countersinking operation while the conical 360 degree end 22 of the sleeve 21 will be engaged continuously against the workpiece immediately adjacent the blade 17 and will thereby tension the workpiece and prevent the same from chattering. It will also be seen that the blade 17, being free to move transversely of the axis of the tool as illustrated by a broken line illustration in Figure 2 of the drawings, is free to seek the actual center of the opening in which it is disposed and operated and thus is able to balance its cutting edges with respect to one another and the degree of the cut being taken so that there is no tendency to impart chattering or any other irregular motion to the workpiece or the blade.

It will further be seen that the blade is substantially supported along its opposite sides; first, by the body member 10, and particularly the conical end portion 13 in which the major portion of the blade 17 is disposed, and, secondly, by the engaging portions of the conical end 22 of the sleeve 21 where the blade 17 passes through the same in the slot 23.

It will thus be seen that the chatterless countersink and deburring tool disclosed herein meets the several objects of the invention.

Having thus described our invention, what we claim is:

1. A countersink and deburring tool comprising an annular body having a transversely slotted conical projecting head and an oppositely disposed cylindrical extension, a triangular blade disposed in said transverse slot, said blade having a transversely elongated opening therein, said body having a cylindrical opening therethrough, said blade being wider than said annular body, a pin disposed in said openings seating said blade against said body for movement transversely of said body, a sleeve having a conical end positioned over said body with said conical end spaced with respect to said body, said sleeve having a transversely extending slot therein through which said blade projects axially, means adjustably positioned on said cylindrical extension, and spring means disposed between said sleeve and said means for urging said sleeve axially of said tool.

2. A countersink and deburring tool as set forth in claim 1 wherein the means adjustably positioned on said cylindrical extension comprise a pair of flanged collars, one of which is engaged against the other and against said tensioning means and the other of which is threadably engaged on said cylindrical extension.

3. A countersink and deburring tool as set forth in claim 2 and wherein a tension spring is disposed about said cylindrical extension within said flanged collar threadably engaged thereon and held thereby against said annular body.

4. A countersink and deburring tool as set forth in claim 1 wherein said sleeve has an opening therein in alignment with the opening in said body through which said pin is positioned, and means normally plugging said opening in said sleeve.

5. A countersink and deburring tool as set forth in claim 1 and wherein the innermost end of said transverse slot in said annular body defines a straight flat surface and the innermost edge of said blade is straight and flat and positioned against said flat surface of said body as defined by the innermost end of said slot in abutting relation thereto.

6. A countersink and deburring tool as set forth in claim 1 wherein the opposite sides of said blade extend through sides of the transverse slot in said sleeve and act to retain said sleeve and its conical end in operative relation to said body and blade while movable axially thereof.

7. A countersink and deburring tool as set forth in claim 1 and wherein the blade is secured in said body by said pin in non-moving axial relation thereto and arranged for transverse movement in said transverse slot with respect to said body whereby said blade is self-centering in an opening in a workpiece with respect to said annular body and said conical end of said sleeve.

References Cited in the file of this patent

UNITED STATES PATENTS

| | | |
|---|---|---|
| 2,187,221 | Brown | Jan. 16, 1940 |
| 2,694,321 | Riza | Nov. 16, 1954 |
| 2,703,996 | Reynolds et al. | Mar. 15, 1955 |